June 19, 1923.
J. R. SCOTT
1,459,418
ANTISKIDDING DEVICE FOR MOTOR VEHICLES
Filed July 17, 1922
2 Sheets-Sheet 1
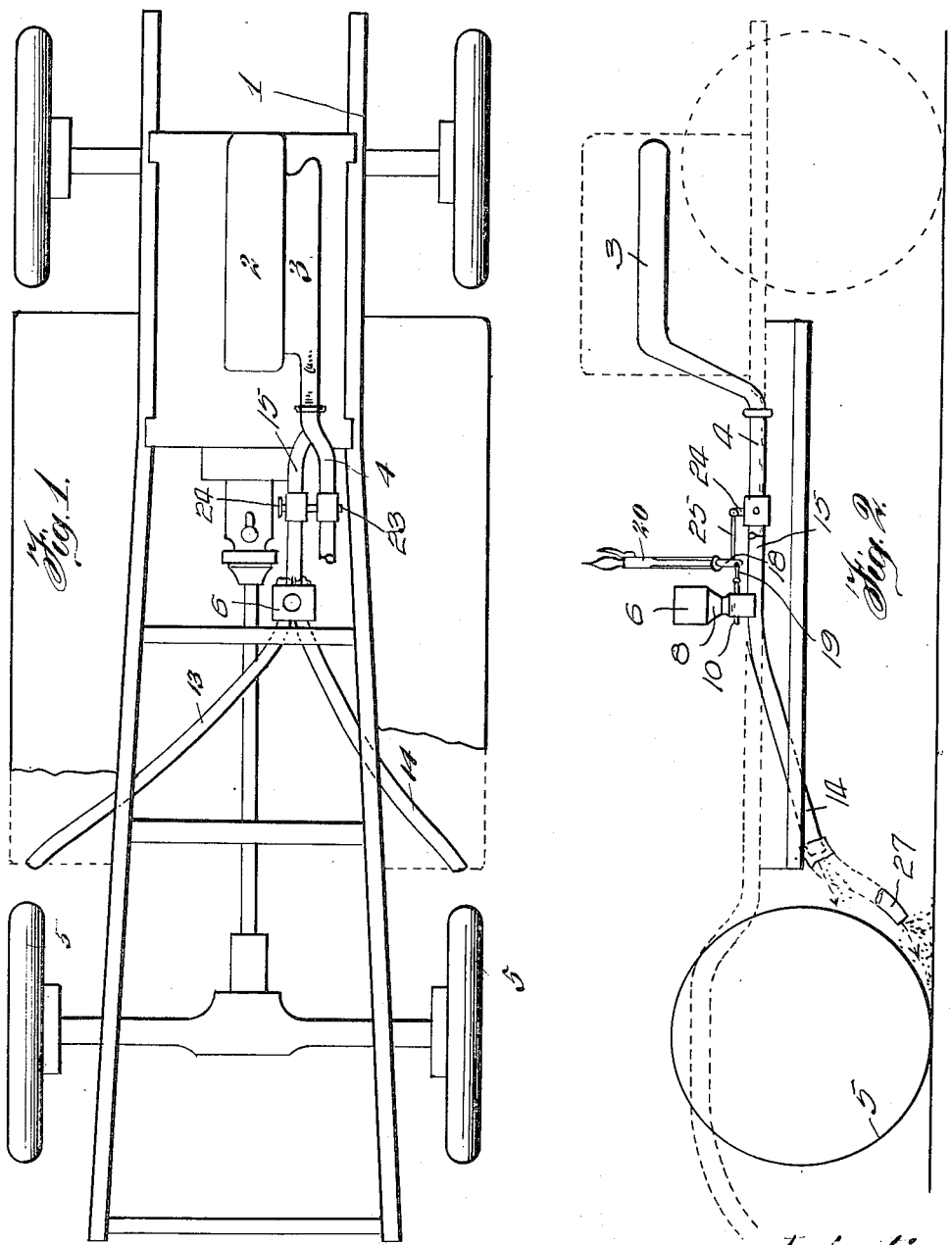
Inventor:
James R. Scott.

June 19, 1923.
J. R. SCOTT
1,459,418
ANTISKIDDING DEVICE FOR MOTOR VEHICLES
Filed July 17, 1922    2 Sheets-Sheet 2
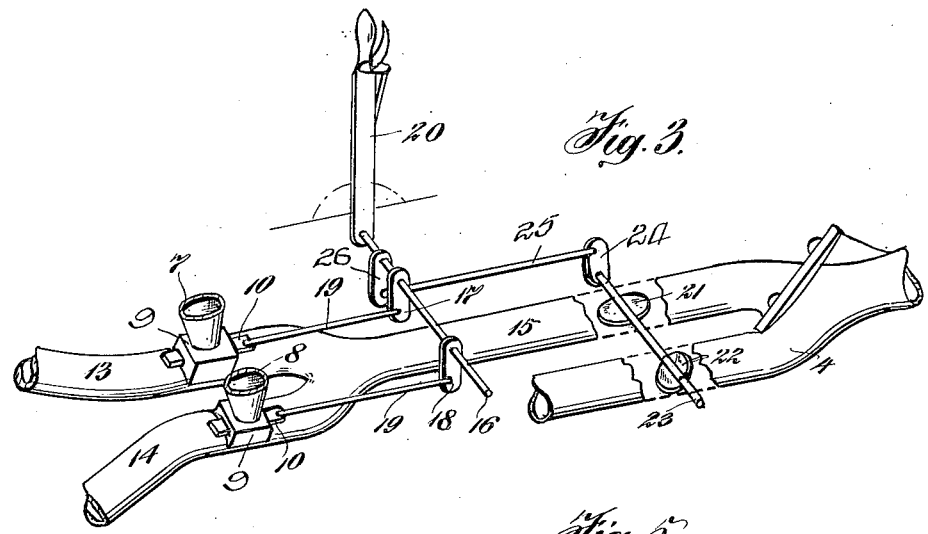
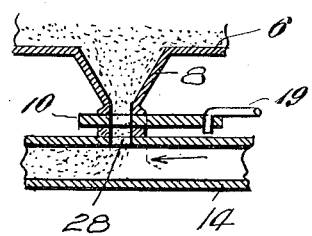
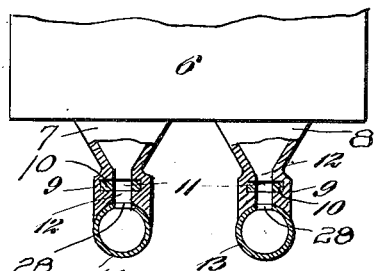
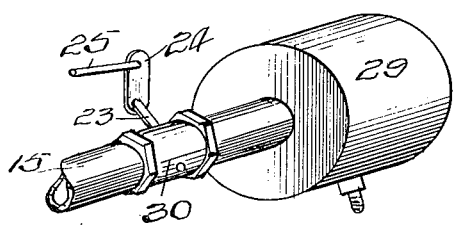
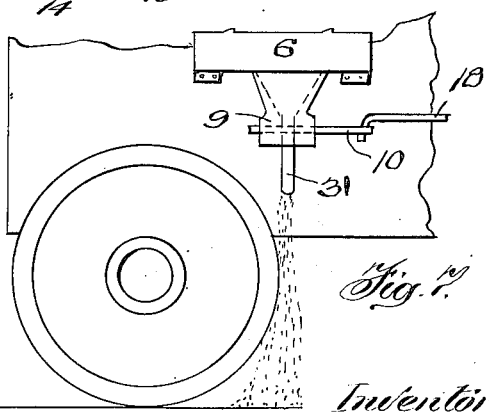
Inventor:
James R. Scott
By Fred K. Carson
his Attorney Patented June 19, 1923.

1,459,418

UNITED STATES PATENT OFFICE.

JAMES R. SCOTT, OF ST. LOUIS, MISSOURI.

ANTISKIDDING DEVICE FOR MOTOR VEHICLES.

Application filed July 17, 1922. Serial No. 575,480.

*To all whom it may concern:*

Be it known that I, JAMES R. SCOTT, a citizen of the United States, residing in the city of St. Louis and State of Missouri, have invented a certain new and useful Antiskidding Device for Motor Vehicles, of which the following is a specification.

This invention relates to an anti-skidding device for vehicles, such for instance as automobiles, and, has for its object the provision of a device for applying a suitable traction adhesive, such as sand, or the like to the road surface to be traversed by the drive wheels of the vehicle to prevent skidding of the vehicle drive wheels thereon.

A further object of the invention is the provision of a device to be attached to a vehicle, in such a manner, that any suitable traction adhesive, such for instance, as sand, or the like, may be directed through delivery tubes to the surface to be traversed by the drive wheels of the vehicle to prevent skidding thereof.

A still further object of the invention is the provision of manually actuated means to control the release and flow of traction adhesive from its depository to the delivery tubes.

A still further object of the invention is the provision of means for controlling the pressure or force, whether exhaust gas or air, which aids in the propulsion of the traction adhesive as released from its depository to the surface or surfaces to be traversed by the drive wheels of the vehicle.

A still further object of the invention is the provision of a device adapted for connection with the exhaust pipe of a motor vehicle, or a high pressure air tank carried thereby, for providing a force or pressure which may be utilized in delivering the traction adhesive to a slippery surface to be traversed by the drive wheels of the vehicle.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a plan view of a motor vehicle chassis provided with an anti-skidding device embodying my invention, certain portions thereof being removed.

Fig. 2, is a side elevation of a motor vehicle chassis with a device embodying my invention applied thereto.

Fig. 3, is a view in perspective of the several co-operating parts employed in the device embodying my invention.

Fig. 4, is a detail in vertical section of the discharge end of the traction adhesive hopper.

Fig. 5, is a front elevation of the traction adhesive hopper and connected delivery pipes, the latter and the valve connections being shown in cross section.

Fig. 6, is a modification of the invention showing the pressure tube connected with a high pressure air tank instead of with the exhaust pipe of the vehicle.

Fig. 7, is a modification showing the device as applied to trucks where gravity alone is relied upon for delivering the traction adhesive to the surface to be traversed by the drive wheels of the vehicle.

Referring to the drawings, the reference character 1 designates the chassis frame of a vehicle; 2 an internal combustion engine; 3, the exhaust manifold; 4, the exhaust pipe and 5 the drive wheels of the vehicle.

In carrying out the aim of my present invention, I employ a suitable hopper or receptacle 6 for receiving a suitable traction adhesive, such for instance, as an anti-skidding substance like sand, or the like. The receptacle 6 is suitably supported by the chassis frame at some convenient place, preferably below the front seat of the vehicle.

Two funnel shaped necks 7 and 8 extend downwardly from the hopper 6 and their lower ends are each provided with a valve head 9 for receiving a suitable slide valve 10 each having an opening 11, which, when in their open position register with the opening 12 of the respective valve head. The valve head 9 of each funnel shaped neck 7 and 8 is mounted upon and preferably suitably fixed to the traction adhesive delivery pipes, or tubes 13 and 14, respectively, which pipes at their forward ends, as shown in Figs. 1 and 3, terminate in a single pressure delivery pipe 15 and which pipe in turn is suitably connected at its forward end to the exhaust pipe 4.

The mechanism which controls the release of the traction adhesive from its hopper and the force or pressure to aid in propelling or delivering the traction adhesive through the delivery pipes, will now be described.

16 indicates a suitably supported cross shaft having the depending arms 17 and 18, which arms are connected by means of the connecting rods 19 to the slide valves 10 of the neck extensions 7 and 8, respectively of the hopper 6. Rotation of shaft 16 is manually controllable through the medium of a suitable operating lever 20.

21 indicates a suitable valve, such as a butterfly valve positioned within the pressure pipe while 22 indicates a suitable valve positioned within the exhaust pipe 4, both of which are mounted upon a common shaft 23. It will be observed that the valve 21 lies at a right angle to valve 22 so that when the exhaust pipe passage is closed the pressure pipe passage is open and vice-versa. A suitable connecting rod 24 connects an arm 25 fixed to the valve shaft 21 with an arm 26 fixed to the shaft 16, so that when the lever 20 is moved, in either direction, that the valves will be moved in unison with the movement of the slide valves 10. It will be here observed, that when the valve 21 is open that the slide valves 10 will also be open, and that the valve 22 will be closed, and vice-versa.

The traction adhesive delivery pipes 13 and 14, it will be observed from Fig. 1, lead from the hopper 6 to a point adjacent the front of the drive wheels 5 below the running boards of the vehicle, and, when it is desired to lead the pipe to a lower position, suitable extension tubes 27 are applied to the ends of the delivery pipes 13 and 14. This arrangement will cause the traction adhesive to be discharged at a point closer to the surface to be sprinkled with a traction adhesive, as clearly shown in Fig. 2.

Each traction adhesive delivery pipe 13 and 14 is provided with an opening 28, as clearly shown in Figs. 4 and 5, which register with the openings 12 of the valve heads 9, thus permitting the traction adhesive to flow, by gravity, when the slide valves 10 are open, directly into the delivery pipes 13 and 14 permitting same to be carried by pressure through the pipes 13 and 14 and discharged at their free ends against the surface to be traversed by the drive wheels of the vehicle to insure better traction, to either propel, or retard the vehicle and as far as possible to prevent the drive wheels from slipping or skidding.

As shown in the modification in Fig. 6, the pressure pipe 15 is connected to a suitable air pressure pipe 29, instead of the exhaust pressure pipe 4 and in lieu of a butterfly valve 21, I employ a suitable valve 30; the remaining mechanism being the same as shown in Fig. 3, thus making the device applicable to electric and steam propelled vehicles, where exhaust gas pressure is not available, as is manifest.

As shown in the modification shown in Fig. 7, which may be used in connection with trucks, if desired, I provide a hopper 6 above each drive wheel and employ a short vertically disposed traction adhesive delivery pipe 31 and omit the butterfly valve mechanism, shown in Fig. 3, depending upon gravity alone for carrying or propelling the traction adhesive to the slippery traction surface in the path of travel of the drive wheels, the slide valve mechanism being unchanged excepting the connecting rods 18, which must be longer than when exhaust gas or air pressure is used.

The operation of the device is as follows:

When driving upon streets or roads with slippery traction surface and it is desired to prevent the vehicle from skidding as much as possible, the operator manipulates the lever 20 which opens the slide valves 10 and simultaneously opens the valve 21 and closes the valve 22 thereby releasing the traction adhesive into the delivery pipes 13 and 14 through which the traction adhesive is carried by gravity, exhaust gas, or air pressure and discharged upon the slippery surface to be traversed by the driving wheels, as is manifest.

When neither exhaust gas, or air pressure is employed, the operator manipulates the lever 20 which opens the slide valves 10 and the sand will be released from the hopper 6 and be directed and carried by means of gravity to the surface or surfaces desired to be sprinkled with the traction adhesive to prevent skidding of the vehicle drive wheels.

From the foregoing description, it is evident that I provide a simple device which is applicable to any make of motor vehicle, and easily and conveniently controlled to release a quantity of suitable traction adhesive and deposit same on the slippery traction surface to be traversed by a wheel or wheels of a motor vehicle to prevent skidding thereof.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In combination, an exhaust pipe, a fluid pressure pipe, a valve for each pipe, a rocker shaft, a connection between said rocker shaft and the valves, a pair of sand distributing pipes communicating at one end with the fluid pressure pipe, a sand discharge hopper mounted upon each sand distributing pipe, a slide valve for each hopper, a connection between the rocker shaft and each slide valve and an operating lever fixed to said rocker shaft for actuating the aforesaid first mentioned valves and the slide valves simultaneously.

2. An antiskidding device for wheeled motor vehicles comprising, in combination, an engine exhaust pipe, a valve member in said pipe, an elastic fluid pressure delivery pipe having communicative connection with the exhaust pipe in advance of the valve therein, a valve member in said pressure delivery pipe, a pair of sand delivery pipes communicating at the forward ends with the rear end of the pressure delivery pipe and said sand delivery pipes diverging from their point of juncture with the pressure delivery pipe to suitable points in advance of the driven wheels of the motor vehicle, a funnel shaped member mounted upon each sand delivery pipe adjacent its juncture with the pressure delivery pipe and communicating therewith through the medium of a passage, a box mounted upon said funnel shaped members adapted to be filled with sand and communicating with each member so that the antiskidding contents of the holder will by gravity keep the funnel shaped members filled with sand, a slide valve member normally closing the discharge from each funnel shaped member, means for simultaneously opening the valve members controlling the discharge from the funnel shaped members causing the discharge of sand by gravity therefrom and into the sand delivery pipes and means for closing the valve in the exhaust pipe and simultaneously opening the valve in the pressure delivery pipe in unison with the opening of the valve of the funnel shaped members so that the exhaust gas pressure may be directed through the sand delivery pipes to assist in the conveyance of the sand discharged through the delivery pipes and to a slippery traction surface in advance of the driven vehicle wheels to prevent skidding thereof.

In testimony whereof, I have hereunto signed my name to the specification.

JAMES R. SCOTT.